United States Patent
Ambroise et al.

(10) Patent No.: US 6,828,013 B2
(45) Date of Patent: Dec. 7, 2004

(54) POROUS BIAXIALLY ORIENTED HIGH DENSITY POLYETHYLENE FILM WITH HYDROPHILIC PROPERTIES

(75) Inventors: Benoit Ambroise, Fairport, NY (US); Pang-Chia Lu, Pittsford, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 354 days.

(21) Appl. No.: 09/734,101

(22) Filed: Dec. 11, 2000

(65) Prior Publication Data

US 2002/0106502 A1 Aug. 8, 2002

(51) Int. Cl.$^7$ .............................. B32B 5/14; B41M 5/00
(52) U.S. Cl. ..................... 428/308.4; 428/447; 428/523; 428/515; 428/516; 428/317.9; 428/316.6; 428/910; 428/32.17; 428/32.11
(58) Field of Search .......................... 428/308.4, 317.9, 428/318.6, 319.1, 910, 447, 523, 515, 516, 316.6, 32.11

(56) References Cited

U.S. PATENT DOCUMENTS

| | | |
|---|---|---|
| 3,505,377 A | 4/1970 | Morehouse |
| 3,853,601 A | 12/1974 | Taskier |
| 3,877,372 A * | 4/1975 | Leeds .......................... 101/465 |
| 3,929,509 A | 12/1975 | Taskier |
| 4,160,776 A | 7/1979 | Scardera et al. .......... 260/448.8 |
| 4,226,794 A | 10/1980 | Scardera et al. ............. 556/443 |
| 4,337,168 A | 6/1982 | Scardera et al. ............. 252/312 |
| 4,377,616 A | 3/1983 | Ashcraft et al. ............. 428/213 |
| 4,547,405 A | 10/1985 | Bedell et al. ................ 427/256 |
| 4,575,465 A | 3/1986 | Viola .......................... 427/261 |
| 4,592,951 A | 6/1986 | Viola |
| 4,592,954 A | 6/1986 | Malhotra ..................... 428/335 |
| 4,593,951 A | 6/1986 | Viola .......................... 428/323 |
| 4,632,869 A | 12/1986 | Park et al. ................ 428/315.5 |
| 4,731,304 A * | 3/1988 | Lundquist et al. ............. 429/62 |
| 4,861,644 A | 8/1989 | Young et al. ................ 428/195 |
| 4,900,620 A | 2/1990 | Tokita et al. ................ 428/330 |
| 4,904,519 A | 2/1990 | Newman ..................... 428/203 |
| 5,120,594 A * | 6/1992 | Mrozinski ................... 428/195 |
| 5,169,712 A | 12/1992 | Tapp |
| 5,326,391 A * | 7/1994 | Anderson et al. ............ 106/409 |
| 5,342,688 A | 8/1994 | Kitchin et al. ............... 428/402 |
| 5,451,460 A | 9/1995 | Lu et al. ..................... 428/349 |
| 5,455,217 A * | 10/1995 | Chang et al. ................ 503/227 |
| 5,468,712 A * | 11/1995 | Minato et al. ............... 503/227 |
| 5,650,451 A | 7/1997 | Yagi et al. ................... 521/143 |
| 5,699,189 A | 12/1997 | Murphy ....................... 359/601 |
| 5,721,086 A * | 2/1998 | Emslander et al. .......... 430/126 |
| 5,885,721 A | 3/1999 | Su et al. ...................... 428/516 |
| 5,948,519 A * | 9/1999 | Yagi et al. ................ 428/304.4 |
| 5,948,557 A * | 9/1999 | Ondeck et al. ................ 429/33 |
| 5,968,643 A * | 10/1999 | Topolkaraev et al. ..... 428/305.5 |
| 5,985,793 A | 11/1999 | Sandbrink et al. ........... 504/116 |
| 6,022,677 A * | 2/2000 | Bourdelais et al. .......... 430/496 |
| 6,114,022 A | 9/2000 | Warner et al. ............ 428/315.5 |
| 6,124,770 A * | 9/2000 | Sakamoto et al. ........... 333/242 |
| 6,276,273 B1 * | 8/2001 | Aurenty et al. .............. 101/457 |
| 6,383,612 B1 * | 5/2002 | Waller et al. ................ 428/195 |

* cited by examiner

Primary Examiner—Terrel Morris
Assistant Examiner—Hai Vo
(74) Attorney, Agent, or Firm—Rick James

(57) ABSTRACT

The present invention relates to a biaxially oriented film having a water wettable surface, the film containing a water wettable porous high density polyethylene (HDPE) surface layer. The water wettable surface layer contains porous HDPE and a silicone glycol coating impregnated in the pore of the HDPE surface layer. The biaxially oriented water wettable film is useful for ink jet printing.

10 Claims, No Drawings

POROUS BIAXIALLY ORIENTED HIGH DENSITY POLYETHYLENE FILM WITH HYDROPHILIC PROPERTIES

BACKGROUND

The present invention relates to polymeric films. More specifically, the present invention relates to hydrophilic films useful for ink jet printing.

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching and windup. For a general description of these and other processes associated with film-making, see K R Osborn and W A Jenkins, *Plastic Films: Technology and Packaging Applications,* Technomic Publishing Co., Inc., Lancaster, Pa. (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength. Biaxial orientation is employed to more evenly distribute the strength qualities of the film in two directions. Biaxially oriented films tend to be stiffer and stronger, and also exhibit much better resistance to flexing or folding forces and tearing than non-oriented films or films oriented in only one direction.

Ink jet printers, that is to say printers which form an image by firing a plurality of discrete drops of ink from one or more nozzles onto the surface of a recording sheet placed adjacent the nozzles, have recently enjoyed a large increase in sales. Such ink jet printers have the advantage that they can reproduce good quality text and images, in both monochrome and full color, can produce both reflection prints and transparencies, and are relatively inexpensive to manufacture and to operate, as compared with, for example, color laser printers, thermal wax transfer printers and dye sublimation printers. Accordingly, ink jet printers now dominate the home/small office market, and are often also used to provide color capability not available from the monochrome laser printers typically employed in larger offices.

Although, modern ink jet printers can print on almost any conventional paper or similar medium, and indeed are routinely used with commercial photocopying paper for printing text, the quality of images produced by such printers is greatly affected by the properties of the medium used. To produce high quality images reliably, it is necessary that the medium (ink jet recording sheet) used rapidly absorbs the ink, in order that the ink does not remain wet for an extended period, since otherwise the ink is likely to smear when successive sheets are stacked in the output tray of the printer. On the other hand, the medium should not promote excessive spreading of the ink droplet, since such spreading reduces image resolution and may result in color distortion if adjacent ink droplets intermix. The medium must be capable of absorbing the ink without substantial distortion of the medium, since otherwise unsightly "cockling" (formation of ripples and similar folds) may occur, and most observers find such distortions unacceptable. Once the ink has dried, the medium should be such that contact of the image with moist surfaces (such as sweaty fingers) does not result in bleeding of ink from the image. Finally, since the surface characteristics, such as smoothness, glossiness and feel, of the image are largely determined by the same characteristics of the medium, the medium should possess characteristics appropriate to the type of image being printed. When, as is increasingly common, an ink jet printer is used to print a digital image produced by a camera or a scanner, the medium should be smooth and possess the high gloss and smooth feel of conventional silver-halide based photographic printing paper.

It is difficult to reconcile all these demands upon an ink jet printing medium and, as shown by the literature, much research has been dedicated to improving such media. For example, U.S. Pat. No. 4,592,951 describes an ink jet recording sheet comprising a transparent support carrying a layer of cross-linked poly(vinyl alcohol).

U.S. Pat. No. 4,904,519 describes an ink jet recording sheet comprising a transparent polymeric backing having on at least one major surface thereof a transparent, ink-receptive layer comprising a cross-linked, hydrolyzed copolymer of a vinyl ester comonomer selected from the group consisting of vinyl acetate, vinyl propionate and vinyl stearate, and a vinyl amide comonomer selected from the group consisting of N-vinyl pyrrolidone and vinyl acetamide, the degree of hydrolysis being from about 80–95%, and the cross-linking being effected by an agent selected from the group consisting of borates, titanates, dichromates and aldehydes.

U.S. Pat. No. 4,900,620 describes an ink jet recording sheet including a sheet-like substrate composed mainly of 70 to 100 wt % of wood pulp and 0 to 30 wt % of precipitated calcium carbonate and having a Stockigt sizing degree of not less than 2 seconds and not more than 25 seconds when formed into a sheet having a basis weight of 64 g/m$^2$, and a coating layer composed mainly of white pigment, with the coating layer being formed on at least one side of the substrate at a weight of 1 to 10 g/m$^2$. According to this patent, this sheet has a high ink absorption rate and is able to develop bright colors and sharp images.

U.S. Pat. No. 4,592,954 describes a transparency for ink jet printing comprised of a supporting substrate and thereover a coating consisting essentially of a blend of carboxymethyl cellulose, and polyethylene oxides. Also disclosed are papers for use in ink jet printing comprised of a plain paper substrate and a coating thereover consisting essentially of polyethylene oxides.

U.S. Pat. No. 5,342,688 describes an ink-receptive sheet comprising a transparent substrate bearing on at least a major surface thereof an ink-receptive layer which comprises at least one imaging polymer and an effective amount of polymeric mordant, which comprises a polymethylene backbone carrying pendant aminoguanidino groups.

U.S. Pat. No. 4,547,405 describes an ink jet recording sheet comprising a transparent support carrying a layer comprising a mixture of a coalesced block copolymer latex of poly(vinyl alcohol) with polyvinyl(benzyl ammonium chloride) and a water-soluble polymer selected from the group consisting of poly(vinyl alcohol), poly(vinylpyrrolidone) and copolymers thereof.

U.S. Pat. No. 4,575,465 describes an ink jet recording sheet comprising a transparent support carrying a layer formed from a mixture of vinyl-pyridine/vinylbenzyl quaternary ammonium salt copolymer and a hydrophilic polymer selected from the group consisting of gelatin, poly(vinyl alcohol), and hydroxypropyl cellulose, and mixtures thereof.

Many of the proposed inkjet recording sheets, which employ a hydrophilic outer layer, however, do not provide adequate drying times because the water in the ink is not rapidly absorbed by the sheet medium. This results in smearing of the image and possible blocking problems with other recording sheets.

Thus, there is a need for a film material which has good physical characteristics for a printable substrate and which will provide for very rapid ink drying times.

SUMMARY

According to the present invention, a film having a water wettable surface suitable for use in inkjet printing is provided.

More specifically, the present invention relates to providing a biaxially oriented film having a water wettable surface, said film comprising a porous high density polyethylene HDPE surface layer and a coating consisting essentially of a silicone glycol composition impregnated in the pore space of said surface layer.

The porous surface layer can contain an HDPE matrix and a network of interconnecting pores communicating throughout the porous surface layer.

In one embodiment, the porous surface layer will also contain a cavitating agent, such as calcium carbonate. Use of a cavitating agent will result in the formation of a network of interconnecting pores during biaxial orientation.

In one embodiment, a core layer and the porous surface layer are co-extruded. The co-extruded film may be biaxially oriented from about 5 to 8 times in the machine direction and from about 6 to 15 times in the transverse direction.

The porous HDPE surface layer may be impregnated with the silicone glycol coating after the film is biaxially oriented.

The water wettable surface layer is receptive to ink from an inkjet printer.

The present invention provides films having the advantage of good physical characteristics for an ink-jet printing medium and very rapid drying times for the water based inks used in ink jet printing.

DETAILED DESCRIPTION

The present invention provides a biaxially oriented film having a water wettable surface. The film contains a water wettable porous HDPE surface layer. A high density polyethylene (HDPE) core layer may be coextensively adhered to the surface layer. The water wettable porous surface layer contains a porous HDPE layer and a coating disposed on the surface layer, the coating containing a silicone glycol composition.

The porous HDPE layer may be described as having an open cell structure, wherein void spaces are continuous or interconnected so as to form pores which have an opening at an exposed surface of the layer.

Methods for making films with a surface layer with an open cell pore structure are described in U.S. application Ser. No. 09/079,807, filed May 15, 1998, now abandoned. According to this method a cavitating agent is used with a particular polymeric matrix material, which may be high density polyethylene (HDPE). When this material is stretched, separations which form voids are formed not only horizontally, i.e. within or parallel to the plane of the film, but also in the vertical dimension or perpendicular to the plane of the film.

As the term high density polyethylene (HDPE) is used herein, it is defined to mean an ethylene-containing polymer having a density of 0.940 or higher. (Density (d) is expressed as $g/cm^3$.) It is noted that the tensile strength of HDPE increases when the density of HDPE increases. One particularly suitable HDPE is the resin sold as M6211 by Equistar. Another particularly suitable HDPE is the resin sold as HDZ128 by Exxon. Other HDPE resins include, for example, BDM 94-25 available from Fina Oil and Chemical Co. Dallas, Tex., and 19C and 19F available from Nova Corporation, Sarnia, Ontario, Canada.

An incompatible material, also referred to herein as a cavitating agent, is blended with HDPE to provide a voided layer. Such agents may be added to the HDPE prior to extrusion and are capable of generating voids (cavities) in the structure of the film during the film-making process. It is believed that small inhomogeneities introduced into the HDPE layer by the cavitating agent result in points of weakness in the polyethylene sheet. The biaxially orienting step then induces separations in the HDPE layer, causing cavitation in the processed film. As mentioned previously, the separations in the core layer vary in size and are formed not only horizontally, i.e., within or parallel to the plane of the film, but also in the vertical dimension or perpendicular to the plane of the film.

Inorganic cavitating agents, especially hydrophilic inorganic cavitating agents, may be used. Hydrophilic cavitating agents are particularly suited for substrates which are intended to be receptive to water based inks. A preferred cavitating agent is calcium carbonate ($CaCO_3$).

Organic cavitating agents may be used. When used, the organic cavitating agents may be extremely finely divided and resistant to melt at operating temperatures in order to produce the desired degree of inhomogeneity in the polymer sheet. Crosslinked polymeric cavitating agents tend to be particularly melt resistant. Cavitating agents can be included using methods known in the art, such as those described in U.S. Pat. Nos. 4,377,616 and 4,632,869, incorporated herein by reference.

The percentage of cavitating agent included in the HDPE layer, based on the entire weight of the layer, may be from 2 wt % to 40 wt %, for example, from 4 wt % to 24 wt %, e.g., from 7 wt % to 18 wt %, especially when $CaCO_3$ is used.

The blend of HDPE and cavitating agent may be passed through a flat sheet extruder die at a temperature ranging from about 230° C. to about 280° C. This layer may be coextruded with one or more core or backing layers to form a multi-layer film. The extruded layers may be cast onto a cooling drum, quenched and stretched to achieve biaxial orientation.

For example, extruded blends of HDPE and 5 to 10 wt % $CaCO_3$ may be cast onto a caster at a temperature between 160–180° F. (71–82° C.) depending upon the thickness of the sheet, i.e. the caster temperature may be higher for thicker sheets. In addition, each film may be stretched in the machine direction at a temperature about 245–250° F. (118–121° C.) and in the transverse direction at about 262° F. (128° C.).

Conventional casting apparatus may be used to prepare the present film. For example, cast extrusion may use a standard multi-roll stack system or a cast roll with an air cap (high velocity air applied to the outside of the sheet). A cast roll and water bath system may be used, although this type of system can affect film clarity, generally yielding a rougher and more opaque film.

Biaxial orientation of the present film tends to evenly distribute strength qualities of a film in the longitudinal or "machine direction" (MD) of the film and in the lateral or "transverse direction" (TD) of the film. Biaxial oriented films tend to be stiffer and stronger, and also exhibit much better resistance to flexing and folding forces.

Biaxial orientation can be conducted simultaneously in both directions, however, it is expensive to employ apparatus having the ability to do this. Therefore, most biaxial orientation processes use apparatus which stretches the films sequentially, first in one direction and then in the other, preferably in the MD first and then in the TD. A discussion of high biaxial orientation of polyethylene films is provided in U.S. Pat. No. 5,885,721. The present films may, for example, be stretched in the MD from about 5:1 to about 8:1 and in the TD from about 6:1 to about 15:1.

The present film may have more than one cavitated layer. For example, such a three layer film may have a cavitated HDPE surface layer, a cavitated HDPE core layer and a noncavitated (i.e. void free) thermoplastic skin layer.

When the cavitated surface layer is coextruded with one or more noncavitated backing layers, the film is more suited to biaxial orientation, especially in the transverse direction (TD). In particular, without the backing layer, the cavitated surface layer is prone to tearing when cavitated portions are secured by clamps, clips or hooks of a tenter frame and then stretched, especially under the conditions and processing rates used in commercial scale operations.

A non-cavitated backing layer may be separated from an open celled film layer by a simple peeling action. Such separation may take place without much resistance. Peeling the backing layer off of the cavitated surface layer may result in a film which is porous form one surface to the other in a direction perpendicular to the film.

Thinner backing layers, e.g., having a thickness of 0.05 mil or less, tend to be easier to peel off the back of a cavitated layer than thicker backing layers, e.g., having a thickness of greater than 0.05 mil.

The backing layer material may be polypropylene, HDPE or another polymer that can be coextruded with the rest of the film structure (i.e. the cavitated porous layers). For example, the backing layer material may be polypropylene homopolymer, EP copolymer, EPB terpolymer, HDPE, LDPE and other polymers.

Backing layer(s) may be made with various barrier polymers, and/or coated with various barrier polymers, to obtain a barrier layer. Examples of such barrier polymers include polyvinylidene chloride (PVDC) and polyvinyl alcohol (PVOH). The barrier layer may, optionally, be metallized or coated with other materials, such as silica.

Each of the cavitated layer(s) and backing layer(s) may optionally include various additives. Such additives include, but are not limited to, anti-blocks, anti-static agents, coefficient of friction (COF) modifiers, processing aids, colorants, clarifiers, and other additives known to those skilled in the art.

The present cavitated HDPE layers may each have a lofting value of at least 3, for example, about 5. Lofting value is defined herein as the thickness ratio achieved by dividing the thickness of the layer achieved with the cavitating agent by the thickness of the layer (with the same amount of polymer) achieved in the absence of the cavitating agent.

In view of the random matrix structure of the present cavitated HDPE layers, it is difficult to precisely measure the average pore diameter of these layers. However, average pore diameter may be estimated by observation of the film under a scanning type electron microscope. In general terms, these cavitated HDPE layers may have an average pore diameter of 0.1 to 10 microns, for example, from 0.1 to 2 microns.

These cavitated HDPE layers may have a void content (also referred to herein as porosity) of at least 20%, e.g., 20–85%, preferably at least 50%. Porosity is measured by dividing $(T_1-T_2)$ by $T_1$ and multiplying this fraction by 100, wherein $T_1$ is the thickness of the cavitated layer and $T_2$ is the thickness of the layer in the absence of cavitation. $T_2$ may be calculated on the basis of the density of the HDPE.

As described in U.S. Pat. Nos. 4,861,644 and 5,650,451, the polymeric matrix materials in open celled layers may be composed of ultrahigh molecular weight polyethylene, high molecular weight polyethylene or ultrahigh molecular weight polypropylene. However, the present polymeric matrix materials in the open celled layers may also be composed of polymers other than ultrahigh molecular weight polyethylene, high molecular weight polyethylene or ultrahigh molecular weight polypropylene. Indeed, the present open celled layers may be substantially free of any such ultrahigh molecular weight polyethylene, high molecular weight polyethylene or ultrahigh molecular weight polypropylene. For the purposes of the present disclosure and the claims which follow, the above-mentioned expression "substantially free" is intended to connote that no such ultrahigh or high molecular weight polymers are intentionally added to the polymeric matrix, but they may be present as unintended impurities in very small amounts, e.g., less than one wt % of the total polymer in the polymeric matrix.

The polyethylene used to form the present open celled film layers may have one or more (for example, all) of the following properties: (1) a molecular weight of less than 250,000; (2) an intrinsic viscosity of less than 5 dl/g, for example, less than 4 dl/g or even 3.5 dl/g (e.g., as measured by the method described in U.S. Pat. No. 5,650,451); and (3) an ASTM D 1238-86 condition E melt index of from 0.4 to about 4, e.g., from 0.5 to about 1.5, grams/10 minutes.

For the above-mentioned ASTM value, it will be understood that condition E may also be expressed as ASTM D 1238-190-2 and involves a temperature of 190° C. and a top load of 2 kg.

Unlike the high molecular weight polymers in the cavitated layers described in U.S. Pat. Nos. 4,861,644 and 5,650,451, the present lower molecular weight polymeric matrix materials need not be combined with a plasticizer or processing aid, such as a paraffin wax. Consequently, the present cavitated layers, made from lower molecular weight polymers, do not need to be subjected to an extraction treatment to remove the plasticizer. Furthermore, as pointed out in U.S. Pat. No. 5,650,451 at column 11, lines 59–64, even after an extraction treatment, up to 5 wt % of residual plasticizer can remain in the film. The present cavitated layers, prepared without a plasticizer, are obviously totally free of residual plasticizer.

To render an open celled porous film made from a polyolefin water absorbent, it is necessary to treat not only the outer surface of the film but also the inner surfaces of the pores. The present impregnation treatment with a silicone glycol is well adapted to penetrate into the pore space of the porous HDPE surface layer.

The porous film may be, optionally, laminated to a substrate, such as a paper substrate, either before or after being coated with silicone glycol.

The composition used to coat the porous film may contain a silicone glycol copolymer (or silicone polyether) surfactant. A particularly suitable silicone glycol copolymer surfactant is Dow Corning Q2-5211.

The silicone glycol copolymer surfactant may be a superwetting or superspreading surfactant, classified as an organosilicone wetting agent in U.S. Pat. No. 5,985,793. Such organosilicone wetting agents include those of the formula:

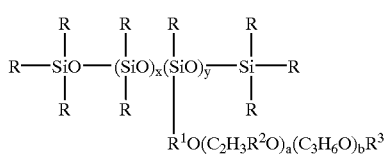

(I)

where each R is independently a monovalent saturated or unsaturated alkyl radical having 1–20 carbon atoms, more preferably having 1–6 carbon atoms, $R^1$ is a divalent alkylidene radical having 1–20 carbon atoms, more preferably having 1–6 carbon atoms, $R^2$ is independently hydrogen or a $C_1$–$C_4$ alkyl radical, $R^3$ is hydrogen or a monovalent saturated or unsaturated alkyl radical having 1–20 carbon atoms, more preferably having 1–10 carbon atoms, x is an integer or average of integers greater than or equal to zero and preferably less than 100, y and a are integers or averages of integers independently greater than or equal to one and preferably less than 30, and b is an integer or average of integers greater than or equal to zero and preferably less than 30.

In a particular subclass of the compounds of Formula I, R and $R^3$ are —$CH_3$, $R^1$ is —$C_3H_6$—, $R^2$ is hydrogen, x is zero or one, y is one to five, a is five to 20, and b is zero. Another subclass of the compounds of Formula I can be represented by the following formula.

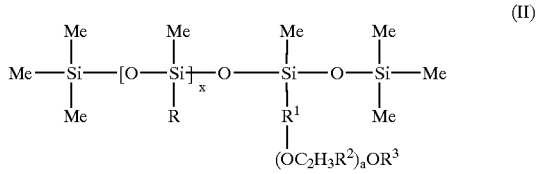

(II)

where a is one to 20, x is zero or one, R is $C_1$–$C_6$ alkyl, $R^1$ is divalent $C_1$–$C_6$ alkylidene, $R^2$ is independently H or —$CH_3$, and $R^3$ is H, $C_1$–$C_4$ alkyl, or $C_2$–$C_4$ acyl. A particular organosilicone wetting agent within the abovementioned two subclasses of Formula I is the compound having the following formula:

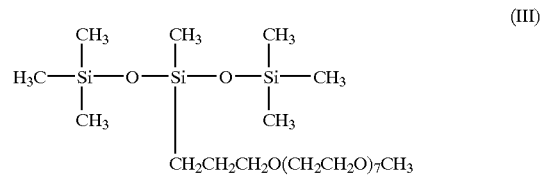

(III)

Another class of organosilicone wetting agents has the general formula:

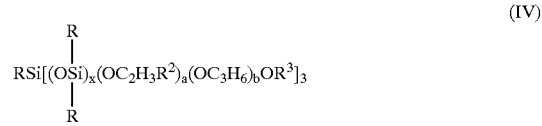

(IV)

where R, $R^2$, $R^3$, x, a and b are as defined above for Formula I, except that x must be greater than one. In compounds of Formula IV, for example, R and $R^3$ may be —$CH_3$, $R^2$ may be hydrogen, a may be five to 20 and b may be zero.

Organosilicones of the above formulas are generally described in product literature of Union Carbide Corp. and OSi Specialties, Inc. (e.g., "Silwet™ Surfactants," OSi Specialties, Inc., Danbury, Conn., 1994), and in U.S. Pat. No. 3,505,377, the disclosure of which is incorporated herein by reference. Several of such ethoxylated organosilicone wetting agents are available from OSi Specialties as Silwet silicone glycol copolymers. Particular Silwet surface active copolymers include Silwet L-77, Silwet 408, and Silwet 800. Silwet L-77 an ethoxylated organosilicone wetting agent which has an average formula corresponding to Formula III above. Another particular organosilicone wetting agent is Q2-5211, available from Dow Corning Corporation. In U.S. Pat. No. 5,699,189, Q2-5211 is said to be a methyl(propylhydroxide, ethoxylated)bis(trimethylsiloxy) silane with a molecular weight of >200. Other particular organosilicones are Sylgard 309 of Dow Corning and Dow 193 (also called dimethicone copolyol).

An additional class of organosilicone wetting agents has the average formula:

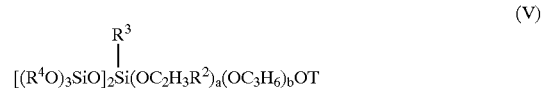

(V)

where $R^2$, $R^3$, a, and b are as defined above for Formula IV, each $R^4$ group is independently a monovalent saturated or unsaturated alkyl radical preferably having 1–20 carbon atoms, and T is hydrogen, a monovalent saturated or unsaturated alkyl radical preferably having 1–20 carbon atoms, or a group of the formula —$Si(R^3)[OSi(OR^4)_3]_2$. Representative ethoxylated organosilicone wetting agents of Formula V are described in product literature of Olin Corporation and in U.S. Pat. Nos. 4,160,776, 4,226,794, and 4,337,168, the disclosures of which are incorporated herein by reference.

An additional class of organosilicone wetting agents has the average formula:

(VI)

where $R^2$ and $R^4$ are as defined immediately above, e is at least four and preferably less than 30, f is greater than or equal to zero and preferably less than 30, and $T^1$ is hydrogen, a monovalent saturated or unsaturated alkyl radical preferably having 1–20 carbon atoms, or a group of the formula —Si(OR$^4$)$_3$.

The coating can be applied neat or as a solution, especially a dilute aqueous solution, of the silicone glycol, by any suitable method known in the art, such as, for example, spraying, dip coating, air knife coating, bar coating, etc. For example, the coating solution may comprise from about 2 wt % to about 10 wt % silicone glycol in water. The coated film may then be dried to remove solvent, if any, and to provide the finished water wettable multilayer HDPE film. Drying may take place under conditions of elevated temperature, e.g., in an oven. In particular, drying may take place in a floatation dryer that uses hot air to support the web and as the heat transfer and mass transfer medium. Drying may also take place with an infrared dryer.

The silicone glycol coating, after drying, is present in an amount sufficient to improve the water wettability of the film. Effective amounts may be so small that they are difficult to measure accurately by weighing techniques to calculate the weight per unit surface area, e.g., in terms of g/m$^2$, even based on the area of the flat film, assuming no increased surface area attributable to pore space. However, it is estimated the coating weight may be from about 0.01 to 0.3 g/m$^2$, based upon the weight of silicone glycol divided by the area of the flat surface area (assuming no pore space area) of the treated film.

The following non-limiting examples include testing an uncoated porous HDPE film and the porous HDPE film with various coatings by ink jet printing the different films and evaluating the drying time for the ink.

EXAMPLE 1

To evaluate the drying time of ink from an ink jet printer, an uncoated porous HDPE film was prepared.

The uncoated porous HDPE film was a three layer porous HDPE film. The film structure included a top porous surface layer A, and porous core layer B, and a bottom non-porous skin layer C.

The top porous surface layer A included 90.97 wt % HDPE (Exxon 7845.30) as the polymer matrix material, 9 wt % CaCO$_3$ and 0.03 wt % fluoropolymer as an internal lubricant. The CaCO$_3$ and fluoropolymer were both added in the form of a masterbatch with the polymer matrix material. More particularly, the top porous surface layer A included 79 wt % HDPE (Exxon 7845.30) as the polymer matrix material, 18 wt % CaCO$_3$ masterbatch containing 50 wt % CaCO$_3$, and 3 wt % of a masterbatch containing 1 wt % fluoropolymer as an internal lubricant.

The porous core layer B included 94 wt % HDPE (Exxon 7845.30) as the polymer matrix material, and 6 wt % CaCO$_3$. The CaCO$_3$ was both added in the form of a masterbatch with the polymer matrix material. More particularly, the porous core layer B included 88 wt % HDPE (Exxon 7845.30) as the polymer matrix material, and 12 wt % CaCO$_3$ masterbatch containing 50 wt % CaCO$_3$.

The bottom skin layer was a medium density polyethylene (MDPE) (Dowlex 2027A) with a minor amount of antiblock additives.

The total polymer gauge (without cavitation) is 1.4 mil. The cavitated film gauge after biaxial orientation was 4.5 mil. The total polymer gauge was measured after the cavitated film was pressed to a fully compacted state.

The polymer mixtures of the layers were extruded at around 250° C. into a base sheet, which is then stretched 5 times in the machine direction (MD) and 8 times in the transitional direction (TD).

The uncoated porous HDPE film was ink jet printed on a Canon Ink Jet printer (1 black stripe and 6 color stripes) and tested for ink transfer 1 minute after coming out of the printer. In particular, each strip was about 9 inches long, and it took the printer from about 60 to 90 seconds each to complete each strip. The ink applied at the beginning of the printing process was located at the top of each strip, whereas the ink applied at the end of the printing process was located at the bottom of each strip. Therefore, the top portions of each strip had more time to dry than the bottom portions, prior to the ink transfer test.

Paper was placed over the printed face of the film and rolled with a 5 pound weight. The number of ink stripes transferred from the film to the paper indicated the drying time for the ink. The lower the number of stripes transferred, the lower the drying time.

In this ink transfer test of the uncoated film of Example 1, ink was transferred from six of the strips at the top portions thereof, and ink was also transferred from six of the strips at the bottom portions thereof. The results are summarized in Table 1 below. It will be noted that the results for ink transfer are reported in terms of two numbers, i.e. n/m, where n is the number of stripes including ink transferred from the top portion of the stripes and m is the number of stripes including ink transferred from the bottom portion of the stripes.

EXAMPLE 2

Example 1 was repeated using the porous HDPE film of Example 1 coated with a polyvinyl alcohol (PVOH) coating. The results are listed below in Table 1.

EXAMPLE 3

Example 1 was repeated using the porous HDPE film of Example 1 coated with a mixture of PVOH and a block copolymer of propylene oxide and ethylene oxide surfactant (Pluronic F68). The results are listed below in Table 1.

EXAMPLE 4

Example 1 was repeated using the porous HDPE film of Example 1 coated with a mixture of PVOH and an octylphenoxy polyethoxy ethanol surfactant (Triton X405). The results are listed below in Table 1.

EXAMPLE 5

Example 1 was repeated using the porous HDPE film of Example 1 coated with a mixture of PVOH and a sorbitant of an ester of a fatty acid surfactant (Atmer 110). The results are listed below in Table 1.

EXAMPLE 6

Example 1 was repeated using the porous HDPE film of Example 1 coated with a mixture of PVOH and a silicone glycol copolymer surfactant (Dow Corning Q2-5211). The results are listed below in Table 1.

EXAMPLE 7

Example 1 was repeated using the porous HDPE film of Example 1 coated with an acrylic coating. The results are listed below in Table 1.

EXAMPLE 8

Example 1 was repeated using the porous HDPE film of Example 1 coated with a mixture of acrylic and a block copolymer of propylene oxide and ethylene oxide surfactant (Pluronic F68). The results are listed below in Table 1.

EXAMPLE 9

Example 1 was repeated using the porous HDPE film of Example 1 coated with a mixture of acrylic and an octylphenoxy polyethoxy ethanol surfactant (Triton X405). The results are listed below in Table 1.

EXAMPLE 10

Example 1 was repeated using the porous HDPE film of Example 1 coated with a mixture of acrylic and a sorbitant of an ester of a fatty acid surfactant (Atmer 110). The results are listed below in Table 1.

EXAMPLE 11

Example 1 was repeated using the porous HDPE film of Example 1 coated with only a sorbitant of an ester of a fatty acid surfactant (Atmer 110). The results are listed below in Table 1.

EXAMPLE 12

Example 1 was repeated using the porous HDPE film of Example 1 coated with only a silicone glycol copolymer surfactant (Dow Corning Q2-5211). The results are listed below in Table 1.

TABLE 1

| Example | Coating formulation | Ink transfer: |
|---|---|---|
| #1 | Not coated | 6/6 |
| #2 | PVOH | 2/6 |
| #3 | PVOH + Pluronic F68 | 1/6 |
| #4 | PVOH + Triton X405 | 2/6 |
| #5 | PVOH + Atmer 110 | 0/6 |
| #6 | PVOH + Dow Corning Q2-5211 | 4/5 |
| #7 | Acrylic | 7/7 |
| #8 | Acrylic + Pluronic F68 | 6/6 |
| #9 | Acrylic + Triton X405 | 5/6 |
| #10 | Acrylic + Atmer 110 | 5/6 |
| #11 | Atmer 110 | 2/3 |
| #12 | Dow Corning Q2-5211 | 0/1 |

A review of Table 1 reveals that the porous HDPE film coated with only the silicone glycol copolymer surfactant (Dow Corning Q2-5211) gave the best drying time. It will be noted that the coating materials listed in Table 1 include both (1) binders, such as PVOH and acrylic, and (2) surfactants, such as Pluronic F68, Triton X405, Atmer 110 and Dow Corning Q2-5211. The various coatings of mixtures of hydrophilic binders and surfactants gave relatively high drying times. The coating of the other surfactant (Atmer 110) alone also resulted in higher drying times than that of the silicone glycol copolymer surfactant alone.

As can be seen by comparing the results of Example 6 (PVOH+Dow Corning Q2-5211) with the results of Example 12 (Dow Corning Q2-5211 alone), the addition of PVOH to the silicone glycol hindered the drying of the ink. Therefore, it will be understood that the coating material used to treat the porous HDPE film should be essentially free of materials other than silicone glycol, such as binders (especially PVOH), in forms and amounts which substantially hinder the ability of the silicone glycol coating to promote drying of ink applied to the coated film.

What is claimed is:

1. A biaxially oriented film for ink jet printing, said film being ink-absorbing and said film having a water-wettable surface, said film comprising a porous high density polyethylene HDPE surface layer and a coating consisting essentially of a silicone glycol composition impregnated in the pole space of said surface layer, and said porous surface layer further comprising a printed image on an outer surface thereof.

2. A biaxially oriented film according to claim 1, wherein said porous surface layer comprises: (i) a matrix comprising HDPE and (ii) a network of interconnecting pores communicating throughout said porous surface layer.

3. A biaxially oriented film according to claim 2, wherein said porous surface layer further comprises a cavitating agent.

4. A biaxially oriented film according to claim 3, wherein said cavitating agent is calcium carbonate.

5. A biaxially oriented film according to claim 1, further comprising a core layer co-extruded with said porous surface layer.

6. A biaxially oriented film according to claim 5, wherein said core layer is a porous layer comprising (i) a matrix comprising HDPE; (ii) a network of interconnecting pores communicating throughout the porous core layer; and (iii) a cavitating agent.

7. A biaxially oriented film according to claim 6, wherein the cavitating agent of said core layer is calcium carbonate.

8. A biaxially oriented film according to claim 7, further comprising a noncavitated skin layer coextruded to said core layer on the opposite side of the core layer from said porous high density polyethylene HDPE surface layer.

9. A biaxially oriented film according to claim 1, wherein the porous high density polyethylene HDPE surface layer is substantially free of high molecular weight polyethylene.

10. A biaxially oriented film according to claim 1, wherein the porous HDPE surface layer has an average pore diameter of 0.1 to 10 microns.

* * * * *